US011670189B2

(12) United States Patent
Yamamoto (10) Patent No.: US 11,670,189 B2
(45) Date of Patent: Jun. 6, 2023

(54) CLEANUP ASSISTING SYSTEM AND CLEANUP ASSISTING METHOD

(71) Applicant: Panasonic Intellectual Property Management Co., Ltd., Osaka (JP)

(72) Inventor: Yuka Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 78 days.

(21) Appl. No.: 17/610,353

(22) PCT Filed: May 11, 2020

(86) PCT No.: PCT/JP2020/018812
§ 371 (c)(1),
(2) Date: Nov. 10, 2021

(87) PCT Pub. No.: WO2020/241222
PCT Pub. Date: Dec. 3, 2020

(65) Prior Publication Data
US 2022/0238035 A1    Jul. 28, 2022

(30) Foreign Application Priority Data

May 28, 2019   (JP) .............................. JP2019-099056

(51) Int. Cl.
*G09B 19/00*       (2006.01)
*G09B 5/04*        (2006.01)
*G09B 5/06*        (2006.01)

(52) U.S. Cl.
CPC ................ *G09B 19/00* (2013.01); *G09B 5/04* (2013.01); *G09B 5/065* (2013.01)

(58) Field of Classification Search
CPC . G09B 19/00; G09B 5/00; G09B 5/04; G09B 5/06; G09B 5/065
See application file for complete search history.

(56) References Cited

U.S. PATENT DOCUMENTS

2017/0352192 A1* 12/2017 Petrovskaya .......... G02B 27/01

FOREIGN PATENT DOCUMENTS

| JP | 2004-078304 A | 3/2004 |
| JP | 2015-136386 A | 7/2015 |

(Continued)

OTHER PUBLICATIONS

International Search Report and Written Opinion dated Aug. 4, 2020 in International Patent Application No. PCT/JP2020/018812; with partial English translation.

*Primary Examiner* — Timothy A Musselman
(74) *Attorney, Agent, or Firm* — McDermott Will & Emery LLP (57) ABSTRACT

A cleanup assisting system includes: a space state detector that detects a state in which items are scattered in a space; a space state determiner that determines a scattering degree of the items based on a result of detection by the space state detector; an action state detector that detects an action of a first subject person cleaning up the items; an action state determiner that determines whether the first subject person has an interest in the action of cleaning up the items, based on a result of detection by the action state detector; a processor that determines content of a notification to be provided to a second subject person different from the first subject person, based on results of determination by the space state determiner and the action state determiner; and a notifier that provides a notification including the content determined by the processor to the second subject person.

6 Claims, 7 Drawing Sheets

(56) References Cited

FOREIGN PATENT DOCUMENTS

| JP | 2015-142221 A | 8/2015 |
| JP | 2017-036976 A | 2/2017 |
| JP | 2017-089207 A | 5/2017 |
| JP | 2017-223812 A | 12/2017 |
| WO | 2018/207519 A1 | 11/2018 |

* cited by examiner

| Scattering degree | Score |
|---|---|
| High | 5 points |
| Medium | 3 points |
| Low | 1 point |
| ... | ... |

CLEANUP ASSISTING SYSTEM AND CLEANUP ASSISTING METHOD

CROSS-REFERENCE OF RELATED APPLICATIONS

This application is the U.S. National Phase under 35 U.S.C. § 371 of International Patent Application No. PCT/JP2020/018812, filed on May 11, 2020, which in turn claims the benefit of Japanese Application No. 2019-099056, filed on May 28, 2019, the entire disclosures of which Applications are incorporated by reference herein.

TECHNICAL FIELD

The present disclosure relates to a cleanup assisting system and a cleanup assisting method.

BACKGROUND ART

Patent Literature 1 (PTL 1) discloses a position management system including: an obtainer that obtains image data of a target area from an imager; a determiner that determines the tidiness of target objects in the target area based on the amount of displacement of the position of each target object in the image data from a reference position indicated by reference data; and an outputter that outputs output data indicating the result of the determination made by the determiner.

PTL 2 discloses a toilet system having a toilet training mode in which the state of a toilet device being used by a user is identified, and content according to the result of the identification is sent to a communication device.

CITATION LIST

Patent Literature

[PTL 1] Japanese Unexamined Patent Application Publication No. 2017-36976
[PTL 2] Japanese Unexamined Patent Application Publication No. 2017-89207

SUMMARY OF INVENTION

Technical Problem

The position management system in PTL 1 simply determines the tidiness of items, which are the target objects, and outputs the result of the determination. Such a system, however, cannot cause a relevant person to learn the action of cleaning up the items. There is a need to motivate the relevant person to clean up the items.

The toilet system in PTL 2 causes a display screen to show content indicating, for example, the next action to be taken by the user in using the toilet. This toilet system could be applied to learning the action of cleaning up items. However, for example, infant users vary in development level. Displaying content that does not reflect each infant's development level may be ineffective for learning the cleanup action.

An object of the present disclosure, which has been made for solving the above problem, is to provide a cleanup assisting system and a cleanup assisting method in which more efficient cleanup education can be provided than in conventional techniques.

Solution to Problem

In order to achieve the above object, a cleanup assisting system according to an aspect of the present disclosure includes: a space state detector that detects a state in which items are scattered in a space; a space state determiner that determines a scattering degree of the items based on a result of detection by the space state detector; an action state detector that detects an action of a first subject person cleaning up the items; an action state determiner that determines whether the first subject person has an interest in the action of the first subject person cleaning up the items, based on a result of detection by the action state detector; a processor that determines content of a notification to be provided to a second subject person different from the first subject person, based on a result of determination by the space state determiner and a result of determination by the action state determiner; and a notifier that provides a notification including the content determined by the processor to the second subject person.

Moreover, in order to achieve the above object, a cleanup assisting method according to an aspect of the present disclosure includes: detecting a state in which items are scattered in a space; determining a scattering degree of the items based on a result of detection of the state in which the items are scattered; detecting an action of a first subject person cleaning up the items; determining whether the first subject person has an interest in the action of the first subject person cleaning up the items, based on a result of detection of the action of cleaning up the items; determining content of a notification to be provided to a second subject person different from the first subject person, based on a result of determination of the scattering degree of the items and a result of determination of whether the first subject person has the interest; and providing a notification including the content determined to the second subject person.

Advantageous Effects of Invention

A cleanup assisting system and a cleanup assisting method according to the present disclosure can provide more efficient cleanup education than by conventional techniques.

DESCRIPTION OF EMBODIMENT

The following describes an embodiment of the present disclosure with reference to the drawings. Note that the following embodiment illustrates one specific example. Therefore, the numerical values, shapes, materials, elements, the arrangement and connection of the elements, steps, the processing order of the steps etc. illustrated in the following embodiment are mere examples, and are not intended to limit the present disclosure. Accordingly, among the elements in the following embodiment, those not recited in any of the independent claims are described as optional elements.

The drawings are represented schematically and are not necessarily precise illustrations. Thus, the scales and the like of the drawings are not necessarily precise. Moreover, in the drawings, the same reference signs are given to essentially the same elements, and redundant descriptions are omitted or simplified.

The following describes a cleanup assisting system and a cleanup assisting method according to an embodiment of the present disclosure.

Embodiment

[Configuration: Cleanup Assisting System 1]

Figure 1:
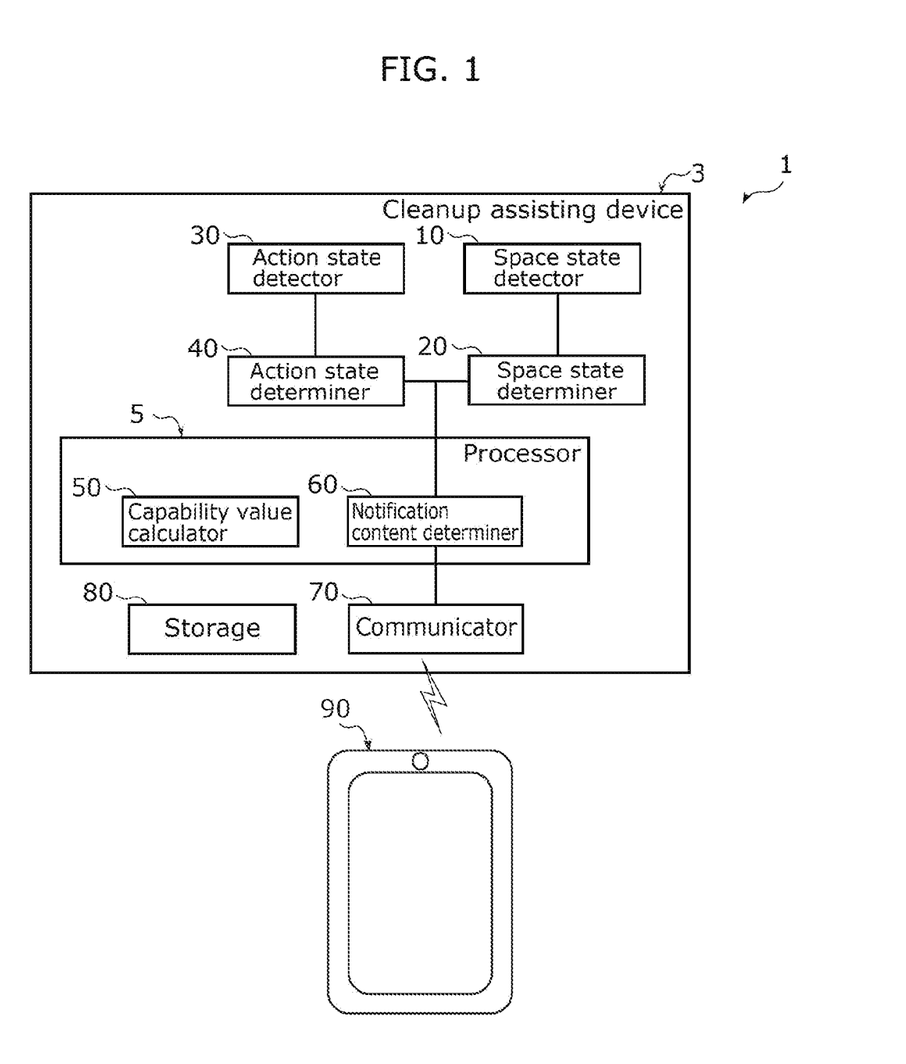
FIG. 1 is a block diagram illustrating a cleanup assisting system according to an embodiment.

FIG. 1 is a block diagram illustrating cleanup assisting system 1 according to an embodiment.

As shown in FIG. 1, cleanup assisting system 1 aims to cause a first subject person to clean up items scattered in a space and outputs, on a display, content for a second subject person to directly or indirectly assist the first subject person in cleanup. The first subject person is a specific person who is, for example, an infant or a child. The second subject person is a person different from the first subject person, for example the first subject person's father, mother, grandfather, or grandmother. The items, such as toys and clothes, are typically in a room or a building. The second subject person sees the content on the display and provides assistance indirectly by encouraging the first subject person in cleanup, or directly by helping the first subject person in cleanup.

As shown in FIG. 1, cleanup assisting system 1 includes space state detector 10, space state determiner 20, action state detector 30, action state determiner 40, processor 5, communicator 70, storage 80, and notifier 90. In this embodiment, space state detector 10, space state determiner 20, action state detector 30, action state determiner 40, processor 5, communicator 70, and storage 80 constitute cleanup assisting device 3.

<Space State Detector 10>

Space state detector 10, which is, for example, a distance sensor or a time-of-flight (TOF) camera, is a sensor provided in cleanup assisting system 1 for detecting items. Space state detector 10 is not limited to the above examples but may be any other known sensor capable of detecting the state, including the positions and the number, of items.

Space state detector 10 detects a state in which items are scattered in a space. Specifically, space state detector 10 detects the state, including the positions and the number, of items in a space capable of detection by space state detector 10. For example, the position of each item is the position relative to space state detector 10. That is, the position of each item indicates how far and in which direction the item is located with respect to space state detector 10. For example, the position of each item is represented as X-Y coordinates on X and Y axes in a two-dimensional coordinate system defining a horizontal plane in the space. The position of each item may also be represented as an absolute position, such as a latitude and a longitude.

Space state detector 10 outputs information indicating the detection result, including the positions of the items and the number of items, to space state determiner 20.

<Space State Determiner 20>

Space state determiner 20 receives the information indicating the detection result from space state detector 10 and determines the scattering degree of the items based on the result of the detection by space state detector 10. The scattering degree of the items is determined by, for example, the position of each item (indicating the direction and distance with respect to space state detector 10) and the number of items. For example, the scattering degree of the items is higher as the items are farther from where they should be stored, and as more items are scattered.

Once determining the scattering degree of the items, space state determiner 20 outputs information indicating the scattering degree of the items (information indicating the result of the determination by space state determiner 20) to processor 5.

<Action State Detector 30>

Action state detector 30, which is, for example, a distance sensor or a TOF camera, is a sensor provided in cleanup assisting system 1 for detecting cleanup performed by the first subject person. Action state detector 30 is not limited to the above examples but may be any other known sensor capable of detecting the position, movements, etc., of the first subject person.

Action state detector 30 detects the first subject person's action of cleaning up items in a space in which the items are scattered. Specifically, action state detector 30 detects a cleanup action from the position, movements, etc., of the first subject person located in a space capable of detection by action state detector 30. For example, the position of the first subject person is the position relative to action state detector 30. That is, the position of the first subject person indicates how far and in which direction the first subject person is located with respect to action state detector 30. For example, the position of the first subject person is represented as X-Y coordinates on X and Y axes in a two-dimensional coordinate system defining a horizontal plane in the space. The position of the first subject person may also be represented as an absolute position, such as a latitude and a longitude.

Action state detector 30 may also be a gravimetric sensor or a pressure sensor attached to a storage box for storing the items. Putting items into the storage box causes an increase in weight or pressure in the storage box. Action state detector 30 may detect the increase in weight or pressure to detect the first subject person's action of cleaning up the items.

Although action state detector 30 detects a cleanup action when the first subject is determined to be acting in a predetermined manner from the position, movements, etc., of the first subject person, other known methods may be used to detect a cleanup action.

Action state detector 30 outputs, to action state determiner 40, information indicating the result of detecting the first subject person's cleanup action.

<Action State Determiner 40>

Action state determiner 40 obtains the information indicating the detection result from action state detector 30 and determines, based on the result of the detection by action state detector 30, whether the first subject person has an interest in the action of the first subject person cleaning up the items. Specifically, action state determiner 40 determines whether the first subject person has an interest in cleanup by determining whether the first subject person is cleaning up the items from the first subject person's movements and the like indicated by the result of the detection by action state detector 30.

For example, suppose that action state detector 30 is a gravimetric sensor or a pressure sensor, as described above. If, in a short period of time such as several minutes, the scattering degree of the items decreases, or the weight or pressure of items stored in the storage box significantly increases, the first subject person is regarded as actively cleaning up the items. The first subject person is then regarded as having an interest in the action of cleaning up the items. Action state determiner 40 therefore determines that the first subject person has an interest in cleanup.

If, in a long period of time such as several tens of minutes, the scattering degree of the items increases or only slightly decreases, or the weight or pressure of items stored in the storage box decreases or only slightly increases, the first subject person is regarded as not cleaning up the items but playing with the items. The first subject person is then regarded as having no interest in the action of cleaning up the items (being bored with cleanup). Action state determiner 40 therefore determines that the first subject person has no interest in cleanup.

If action state determiner 40 determines that the first subject person has no interest in cleanup, action state determiner 40 outputs information indicating that the first subject person has no interest in cleanup (an example of the information indicating the result of the determination by action state determiner 40) to processor 5.

If action state determiner 40 determines that the first subject person has an interest in cleanup, action state determiner 40 outputs information indicating that the first subject person has an interest in cleanup (an example of the information indicating the result of the determination by action state determiner 40) to processor 5. If the first subject person has an interest in cleanup, processor 5 does not perform processing to be described below because the first subject person will voluntarily clean up the items.

<Processor 5>

Processor 5 is an information processor that, once obtaining the information indicating that the first subject person has no interest in cleanup from action state determiner 40, calculates a cleanup capability value based on the first subject person's action of cleaning up the items, and determines the content of a notification to be provided to the second subject person for assisting the first subject person. If processor 5 obtains the information indicating that the first subject person has an interest in cleanup, processor 5 does not perform the processing to be described below because the first subject person can voluntarily clean up the items.

Processor 5 includes capability value calculator 50, which calculates, based on a threshold (historical data) stored in storage 80, a cleanup capability value related to the first subject person's action of cleaning up the items scattered at a scattering degree. Specifically, processor 5 determines whether the first subject person can clean up the items scattered at a predetermined scattering degree. For example, processor 5 determines whether the first subject person can clean up the items based on the historical data stored in storage 80. Processor 5 may also determine whether the first subject person can clean up the items based on the scattering degree of the items as indicated by the result of the determination by space state determiner 20, and based on whether the first subject person has an interest in cleaning up the items as indicated by the result of the determination by action state determiner 40. Detailed methods of calculating the cleanup capability value will be described below.

If processor 5 determines that the first subject person can clean up the items scattered at the predetermined scattering degree, capability value calculator 50 in processor 5 determines a first cleanup capability value for the first subject person. If processor 5 determines that the first subject person cannot clean up the items scattered at the predetermined scattering degree, capability value calculator 50 determines a second cleanup capability value for the first subject person. The first cleanup capability value is greater than the second cleanup capability value. In this manner, capability value calculator 50 calculates the cleanup capability value depending on whether the first subject person succeeded in cleanup in the past.

Processor 5 also determines a threshold indicating a scattering degree at which the first subject person loses interest in the action of cleaning up the items. That is, processor 5 calculates the threshold based on whether the first subject person can clean up the items scattered at a predetermined scattering degree. At high scattering degrees, the first subject person is less likely to be motivated to clean up the items scatted at above the first subject person's cleanup capability value. The threshold indicates a value for determining whether the first subject person having a certain cleanup capability value can clean up the items by the person's own efforts (for himself).

Processor 5 further includes notification content determiner 60. Notification content determiner 60 determines the content of the notification to be provided to the second subject person, who is different from the first subject person, based on the result of the determination by space state determiner 20 and the result of the determination by action state determiner 40. Specifically, notification content determiner 60 determines the content of the notification to be provided to the second subject person from the scattering degree of the items indicated by the result of the determination by space state determiner 20, and from the cleanup capability value (a cleanup possibility degree indicated by the cleanup capability value) calculated from the first subject person's action suggesting the possibility of cleaning up the items scattered at a predetermined scattering degree (the action indicated by the result of the detection by action state detector 30). That is, notification content determiner 60 determines whether or not the cleanup possibility degree is greater than or equal to the scattering degree of the items and, according to the result, determines the content of the notification to be provided to the second subject person. The cleanup possibility degree, which is indicated by the cleanup capability value, is the degree at which the first subject person can clean up the scattered items. If the cleanup possibility degree is greater than or equal to the scattering degree of the items, the first subject person has the capability of cleaning up the items.

If the cleanup possibility degree is less than the scattering degree, notification content determiner 60 determines content that indicates helping the first subject person's cleanup action. If the cleanup possibility degree is greater than or equal to the scattering degree, notification content determiner 60 determines content that indicates, to the second subject person, encouraging the first subject person's cleanup action.

Here, the content that indicates helping is content for directly assisting the first subject person in cleanup, for example, content that instructs the second subject person to clean up the items together with the first subject person. The content that indicates encouraging is content for indirectly assisting the first subject person in cleanup, for example, content that instructs the second subject person to verbally encourage or praise the first subject person. The content that indicates encouraging does not instruct to actually help the first subject person in cleanup.

Notification content determiner 60 in processor 5 outputs the content determined, i.e., the content that indicates helping or the content that indicates encouraging, to notifier 90 via communicator 70.

<Communicator 70>

Communicator 70 is a communication module that sends, to notifier 90, the content that indicates helping or the content that indicates encouraging. Although communicator 70 in this embodiment is a wireless communication module, communicator 70 may be a wired communication module.

<Storage 80>

Storage 80 is a recording device in which data is recorded on a recording medium such as memory or a hard disk. Storage 80 stores the threshold determined. Specifically, storage 80 stores a historical threshold for the first subject person, or in other words, the cleanup capability value serving as the historical data. Storage 80 also stores the number of cleanup trials indicating the number of times the first subject person tried to clean up the items in the past, the number of successful cleanups indicating the number of times the first subject person successfully cleaned up the items in the past, and the number of failed cleanups indicating the number of times the first subject person failed in cleaning up the items in the past, which are based on the relationship between the cleanup capability value and the scattering degree of the items.

<Notifier 90>

Notifier 90, which is, for example, a smartphone or a tablet computer carried by the second subject person, is an output device that provides a notification to the second subject person by outputting, in the form of video and/or audio, the content determined by notification content determiner 60 in processor 5. In this embodiment, notifier 90 is a display device such as a monitor.

Notifier 90 obtains the content determined by notification content determiner 60 in processor 5, i.e., the content that indicates helping or the content that indicates encouraging. Notifier 90 then provides a notification to the second subject person by displaying the content on the display such as a monitor.

[Operations]

Now, operations in cleanup assisting system 1 and a cleanup assisting method will be described.

Figure 2:
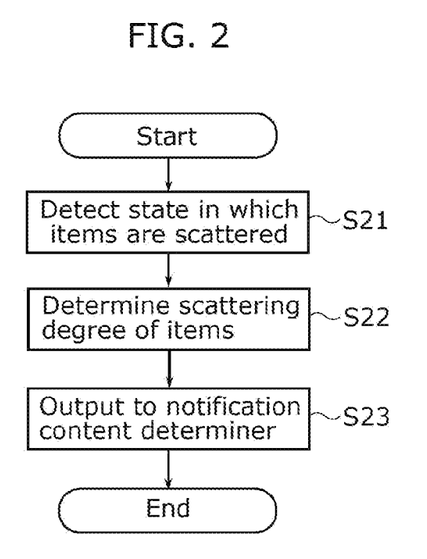
FIG. 2 is a flowchart illustrating a process from processing in a space state detector to processing in a processor in the cleanup assisting system according to the embodiment.

FIG. 2 is a flowchart illustrating a process from processing in space state detector 10 to processing in processor 5 in cleanup assisting system 1 according to the embodiment.

As shown in FIG. 2, first, space state detector 10 detects the state of the items scattered in the space (S21). That is, space state detector 10 detects the state, including the positions and the number, of items in the space capable of detection by space state detector 10. In this embodiment, the position of each item is the position relative to space state detector 10 and is represented as two-dimensional coordinates on X and Y axes intersecting at space state detector 10.

Space state detector 10 outputs information indicating the result of the detection by space state detector 10 to space state determiner 20.

Space state determiner 20 obtains the information indicating the detection result from space state detector 10 and determines the scattering degree of the items based on the result of the detection by space state detector 10 (S22). For example, space state determiner 20 determines the scattering degree indicating to what extent the items are scattered in the space.

Once determining the scattering degree of the items, space state determiner 20 outputs information indicating the scattering degree of the items to notification content determiner 60 in processor 5 (S23). The above process is followed by a process shown in FIG. 4, which will be described after the following description of a process shown in FIG. 3.

Figure 3:
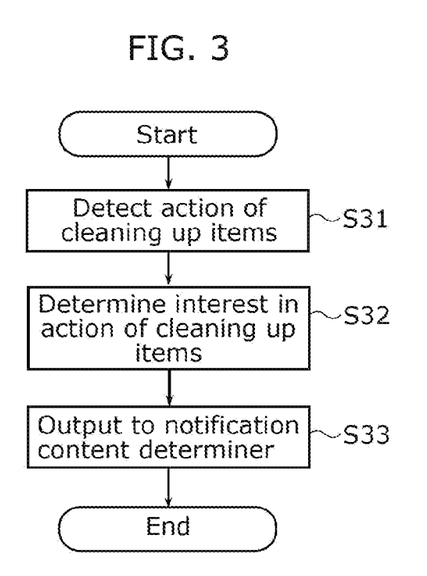
FIG. 3 is a flowchart illustrating a process from processing in an action state detector to processing in the processor in the cleanup assisting system according to the embodiment.

FIG. 3 is a flowchart illustrating a process from processing in action state detector 30 to processing in processor 5 in cleanup assisting system 1 according to the embodiment.

As shown in FIG. 3, first, action state detector 30 detects the first subject person's action of cleaning up the items in the space in which the items are scattered (S31). That is, action state detector 30 detects the cleanup action from the position, movements, etc., of the first subject person located in the space capable of detection by action state detector 30. Action state detector 30 outputs, to action state determiner 40, information indicating the result of the detection by action state detector 30.

Once obtaining the information indicating the detection result from action state detector 30, action state determiner 40 determines, based on the result of the detection by action state detector 30, whether the first subject person has an interest in the action of the first subject person cleaning up the items (S32). For example, action state determiner 40 determines whether or not the first subject person is actually cleaning up the items or is trying to clean up the items, such as trying to carry the items to predetermined places, from the first subject person's movements, i.e., movements of the first subject person's hands, legs, and eyes. If so, action state determiner 40 determines that the first subject person has an interest in cleanup. If the first subject person is not cleaning up the items, action state determiner 40 determines that the first subject person has no interest in cleanup.

If the first subject person has no interest in cleanup, action state determiner 40 outputs, to notification content determiner 60 in processor 5, information indicating that the first subject person has no interest in cleanup (S33). If the first subject person has an interest in cleanup, action state determiner 40 outputs, to processor 5, information indicating that the first subject person has an interest in cleanup.

Figure 4:
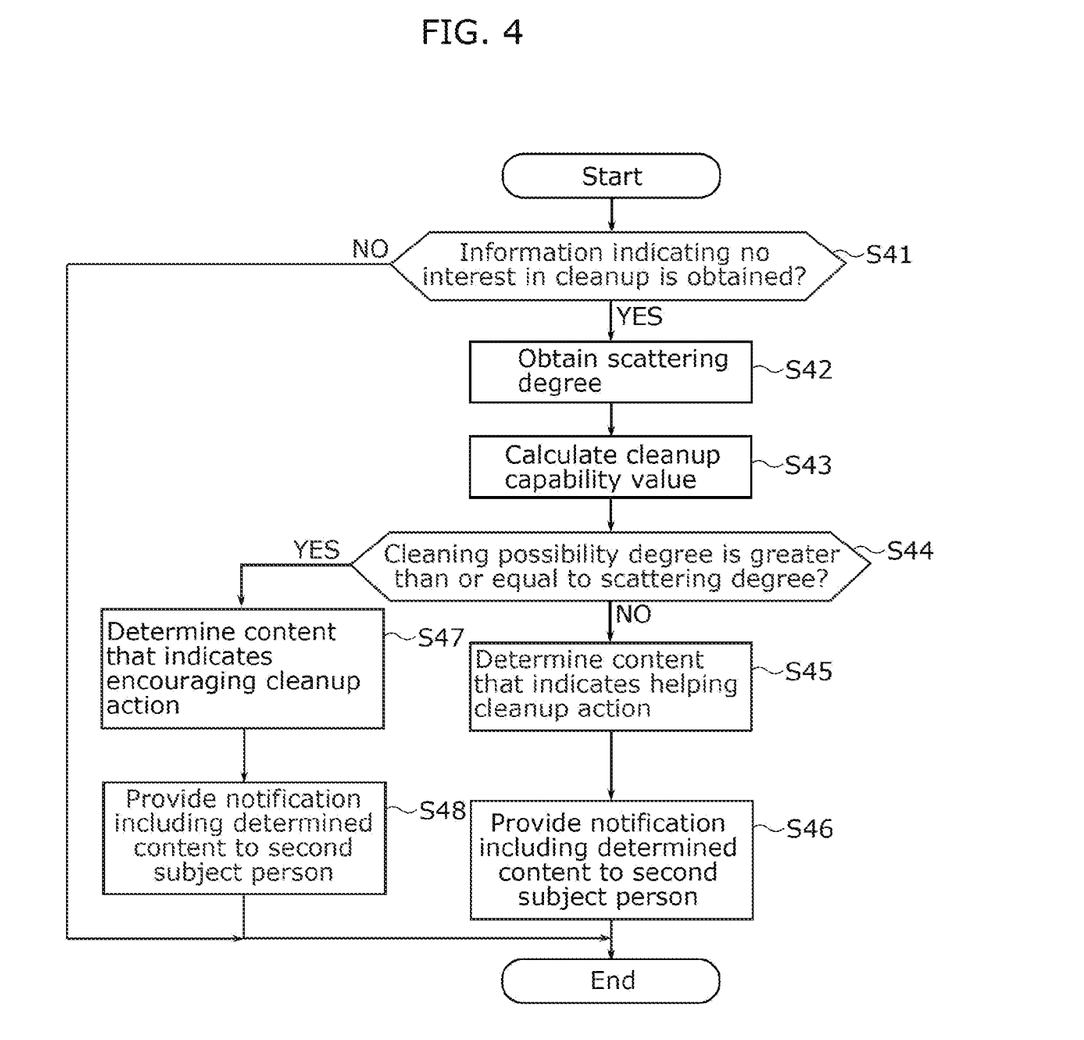
FIG. 4 is a flowchart illustrating a process up to processing in the processor providing the content of a notification to a display in the cleanup assisting system according to the embodiment.

The above process is followed by the process in FIG. 4.

FIG. 4 is a flowchart illustrating a process up to processing in processor 5 providing the content of a notification to the display in cleanup assisting system 1 according to the embodiment.

As shown in FIG. 4, first, processor 5 determines whether processor 5 has obtained information indicating that the first subject person has no interest in cleanup (S41). In other words, processor determines whether processor 5 has obtained information indicating that the first subject person has an interest in cleanup.

If processor 5 has not obtained information indicating that the first subject person has no interest in cleanup (NO at S41), processor 5 has obtained information indicating that the first subject person has an interest in cleanup. The second subject person then does not need to provide any assistance to the first subject person for the moment, because the first subject person has an interest in cleanup. Cleanup assisting system 1 therefore terminates the process without any assistance for the first subject person.

If processor 5 has obtained information indicating that the first subject person has no interest in cleanup (YES at S41), processor 5 has not obtained information indicating that the first subject person has an interest in cleanup. Processor 5 then obtains the information indicating the scattering degree of the items, which is obtained from space state determiner 20 in the processing at step S23 in FIG. 2 (S42).

Capability value calculator 50 in processor 5 then calculates, based on the threshold stored in storage 80, the cleanup capability value related to the first subject person's action of cleaning up the items scattered at a scattering degree (S43). For example, processor 5 determines, based on the historical data stored in storage 80, whether the first subject person can clean up the items. If, for example, the historical data indicates that the first subject person successfully cleaned up the items a predetermined number of times or more, processor 5 may determine that the first subject person can clean up the items.

Processor 5 then determines whether or not the cleanup possibility degree is greater than or equal to the scattering degree of the items (S44).

If the cleanup possibility degree is less than the scattering degree (NO at S44), notification content determiner 60 in processor 5 determines content that indicates helping the first subject person's cleanup action (S45). That is, the cleanup possibility degree less than the scattering degree of the items means that the scattering degree of the items exceeds the first subject person's cleanup capability value. In this case, the first subject person alone cannot finish cleaning up the items.

Figure 5A:
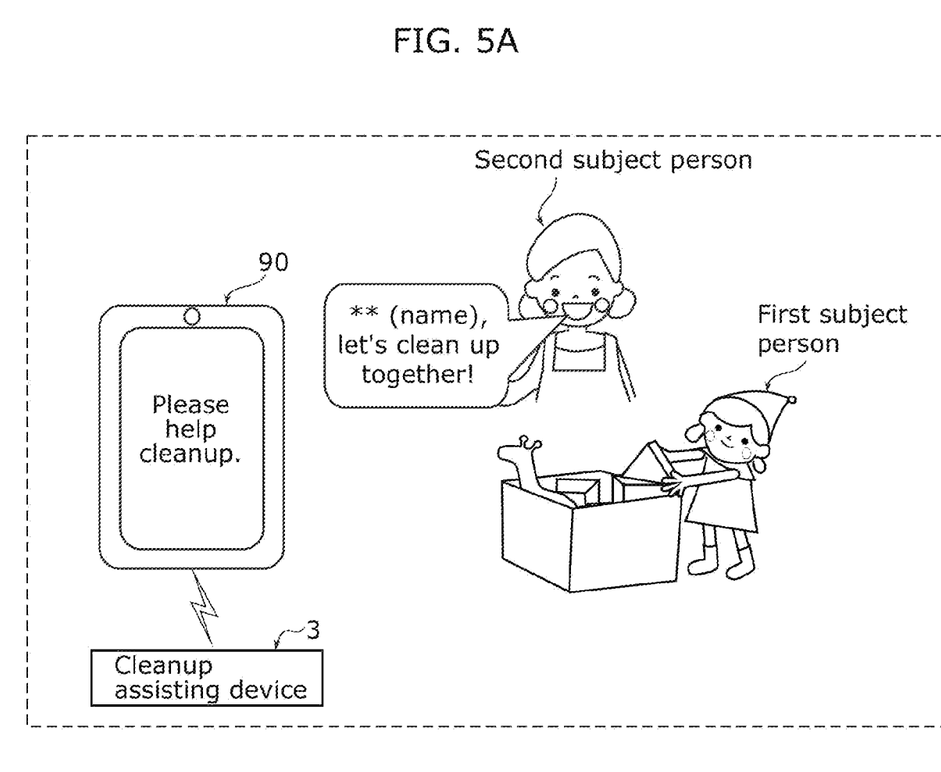
FIG. 5A is a schematic diagram illustrating providing, to the second subject person, the notification including the content that indicates helping the cleanup action in the cleanup assisting system according to the embodiment.

Notification content determiner 60 in processor 5 then sends the content that indicates helping the first subject person's cleanup action (the content determined) to notifier 90 via communicator 70. As shown in FIG. 5A, notifier 90 provides a notification to the second subject person by displaying, on the display, the content that indicates helping the first subject person's cleanup action (S46). FIG. 5A is a schematic diagram illustrating providing, to the second subject person, the notification including the content that indicates helping the cleanup action in cleanup assisting system 1 according to the embodiment.

For example, notifier 90 provides the notification to the second subject person by displaying, on the display, the content "Please help cleanup." that indicates helping the first subject person. The second subject person sees the display of notifier 90 to say "** (name), let's clean up together!" and clean up the items together with the first subject person. The second subject person helps the first subject person in cleanup to cause the first subject person to learn the action of cleaning up items.

Returning to FIG. 4, if the cleanup possibility degree is greater than or equal to the scattering degree (YES at S44), notification content determiner 60 in processor 5 determines content that indicates, to the second subject person, encouraging the first subject person's cleanup action (S47). That is, because the first subject person's cleanup capability is not low, the first subject person is regarded as having the capability of cleaning up the scattered items.

Figure 5B:
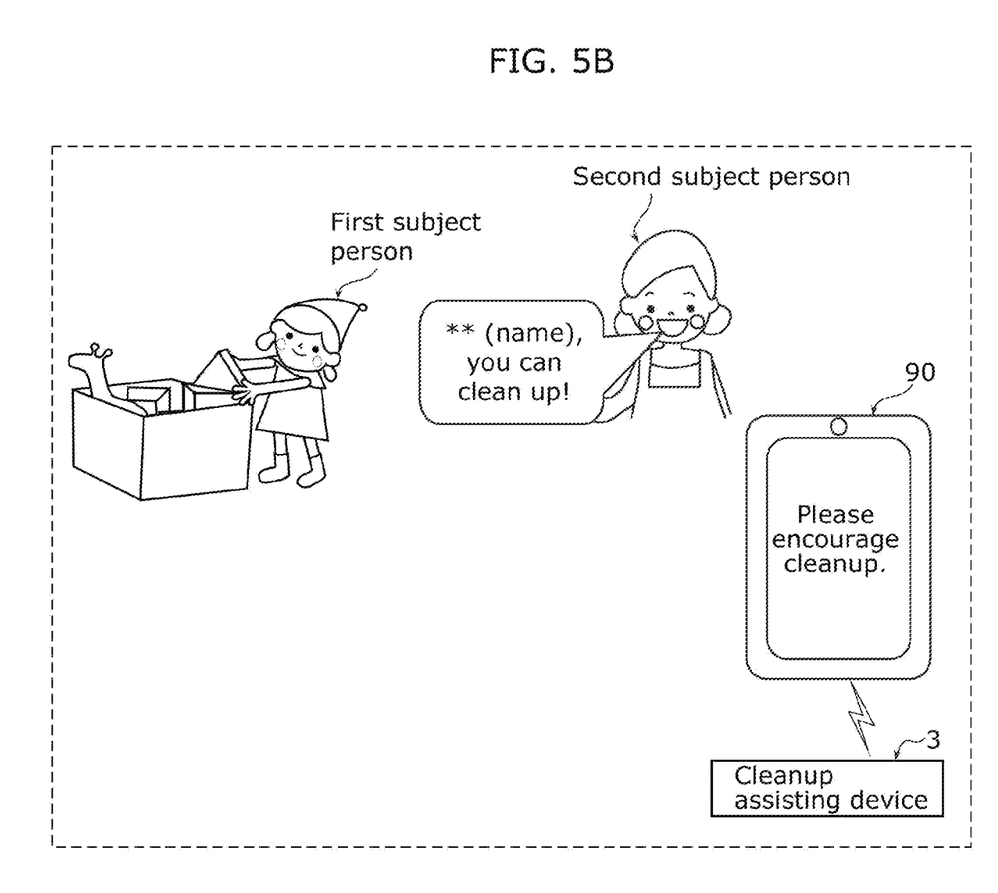
FIG. 5B is a schematic diagram illustrating providing, to the second subject person, the notification including the content that indicates encouraging the cleanup action in the cleanup assisting system according to the embodiment.

Notification content determiner 60 in processor 5 then sends the content that indicates encouraging the first subject person's cleanup action (the content determined) to notifier 90 via communicator 70. As shown in FIG. 5B, notifier 90 provides a notification to the second subject person by displaying, on the display, the content that indicates encouraging the first subject person's cleanup action (S48). FIG. 5B is a schematic diagram illustrating providing, to the second subject person, the notification including the content that indicates encouraging the cleanup action in cleanup assisting system 1 according to the embodiment.

For example, notifier 90 provides the notification to the second subject person by displaying, on the display, the content "Please encourage cleanup." that indicates encouraging the first subject person. The second subject person sees the display of notifier 90 to say "** (name), you can clean up!" and encourage the first subject person in cleaning up the items. In this manner, the second subject person does not help but only encourages the first subject person in cleaning up the items, thereby causing the first subject person to learn the action of cleaning up items.

In cleanup assisting system 1, the content of the notification provided to the second subject person vary depending on the first subject person's cleanup capability and the scattering degree of the items. The second subject person can thus enable appropriate learning by the first subject person.

The calculation of the cleanup capability value at step S43 in FIG. 4 will be described by way of example.

Figure 6:
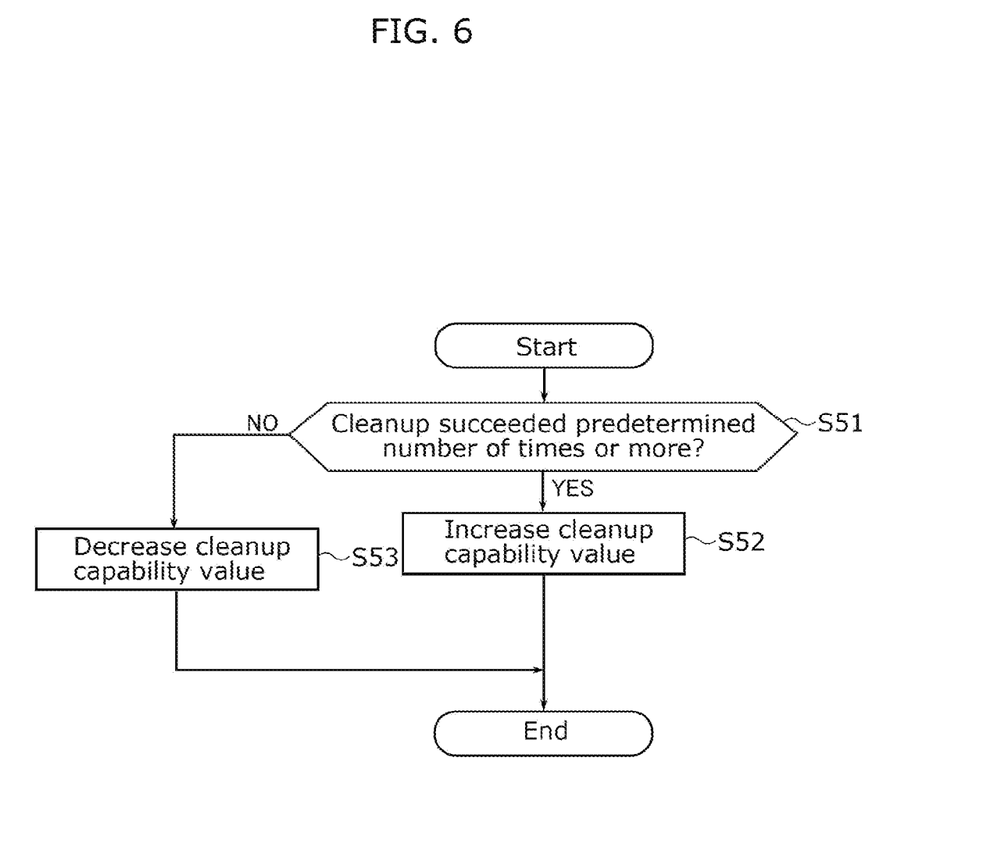
FIG. 6 is a flowchart illustrating calculation of a cleanup capability value in the cleanup assisting system according to the embodiment.

FIG. 6 is a flowchart illustrating the calculation of the cleanup capability value in cleanup assisting system 1 according to the embodiment.

As shown in FIG. 6, capability value calculator 50 in processor 5 reads, from storage 80, historical data such as the number of cleanup trials, the number of successful cleanups, and the number of failed cleanups, and calculates the first subject person's cleanup capability value. Processor 5 determines whether or not the number of successful cleanups out of the number of cleanup trials is greater than or equal to a predetermined number (S51). For example, processor 5 determines whether the number of successful cleanups out of the number of latest cleanup trials (10) reaches the predetermined number (5). Instead of the number of latest cleanup trials, processor 5 may read the number of cleanup trials in a certain period from the historical data in storage 80.

If, of the number of times the first subject person tried to clean up the items scattered at a predetermined scattering degree (the number of cleanup trials), the number of successful cleanups indicating the number of times the first subject person cleaned up the items is greater than or equal to the predetermined number (YES at S51), capability value calculator 50 in processor 5 increases the cleanup capability value (S52). For example, in response to YES at step S51, capability value calculator 50 increases the cleanup capability value Lv 1 by one to obtain the cleanup capability value Lv 2.

In this embodiment, the first subject person starts at Lv 1. If, for example, cleanup succeeded 5 days in 10 days, capability value calculator 50 increments the cleanup capability value Lv 1 by one to obtain the cleanup capability value Lv 2. For example, the first subject person's cleanup capability value Lv 2 is greater than Lv 1. Processor 5 may then determine content corresponding to the cleanup capability value Lv 2 and provide a notification including the content determined to the second subject person (send the content to notifier 90).

By contrast, if, of the number of times the first subject person tried to clean up the items scattered at the predetermined scattering degree (the number of cleanup trials), the number of successful cleanups indicating the number of times the first subject person cleaned up the items is less than the predetermined number (NO at S51), capability value calculator 50 decreases the cleanup capability value (S53). For example, in response to NO at step S51, capability value calculator 50 decreases the cleanup capability value Lv 2 by one to obtain the cleanup capability value Lv 1.

In this embodiment, if, for example, the first subject person gets bored with cleanup and does not clean up the items, the cleanup capability value incremented to Lv 2 as described above is decremented by one to Lv 1. Processor 5 may then determine content corresponding to the cleanup capability value Lv 1 and provide a notification including the content determined to the second subject person (send the content to notifier 90). Although Lvs 1 and 2 are used here, three or more Lvs may be used.

Processor 5 thus terminates the process of calculating the cleanup capability value.

Another example of the calculation of the cleanup capability value at step S43 in FIG. 4 will be described.

Figure 7:
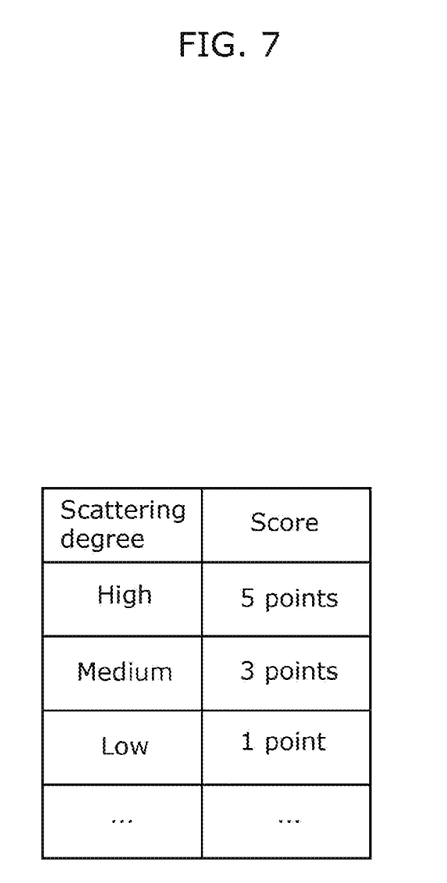
FIG. 7 is a diagram illustrating a table for calculating the cleanup capability value.

FIG. 7 is a diagram illustrating a table for calculating the cleanup capability value.

As shown in FIG. 7, a table is provided in which a score is preset for each scattering degree. The table is stored in storage 80.

For example, for five successful cleanups out of 10 latest cleanup trials, capability value calculator 50 in processor 5 may calculate the sum of the scores in FIG. 7 corresponding to the scattering degrees in the successful cleanups, and divide the sum by the number of latest cleanup trials to obtain an average. Capability value calculator 50 in processor 5 may then determine whether or not the average is greater than or equal to a predetermined value. If the average is greater than or equal to the predetermined value, capability value calculator 50 may increase the cleanup capability value. If the average is less than the predetermined value, capability value calculator 50 may decrease the cleanup capability value.

As another example, for five successful cleanups, capability value calculator 50 may calculate the sum of the scores in FIG. 7 corresponding to the scattering degrees in the successful cleanups. If the sum is greater than or equal to a predetermined value, capability value calculator 50 may increase the cleanup capability value. If the sum is less than the predetermined value, processor 5 may decrease the cleanup capability value.

The cleanup capability value may also be calculated by other known methods.

[Operational Effects]

Now, operational effects of cleanup assisting system 1 and the cleanup assisting method in this embodiment will be described.

As described above, cleanup assisting system 1 according to the present embodiment includes: space state detector 10 that detects a state in which items are scattered in a space; space state determiner 20 that determines a scattering degree of the items based on a result of detection by space state detector 10; action state detector 30 that detects an action of a first subject person cleaning up the items; action state determiner 40 that determines whether the first subject person has an interest in the action of the first subject person cleaning up the items, based on a result of detection by action state detector 30; processor 5 that determines content of a notification to be provided to a second subject person different from the first subject person, based on a result of determination by space state determiner 20 and a result of determination by action state determiner 40; and notifier 90 that provides a notification including the content determined by processor 5 to the second subject person.

For example, whether the first subject person can clean up the scattered items is determined by the scattering degree of the items and whether the first subject person has an interest in the action of cleaning up the items. The first subject person is less likely to be able to clean up the items at higher scattering degrees of the items, and more likely to be able to clean up the items at lower scattering degrees of the items.

According to this embodiment, processor 5 determines the content of the notification to be provided to the second subject person, based on the scattering degree of the items and whether the first subject person has an interest in the action of cleaning up the items. The content indicates, for example, whether the first subject person needs to be helped in cleanup. The second subject person can therefore recognize the content of the notification and appropriately support the first subject person.

Thus, according to cleanup assisting system 1, more efficient cleanup education can be provided than in conventional techniques.

Moreover, the cleanup assisting method according to the present embodiment includes: detecting a state in which items are scattered in a space; determining a scattering degree of the items based on a result of detection of the state in which the items are scattered; detecting an action of a first subject person cleaning up the items; determining whether the first subject person has an interest in the action of the first subject person cleaning up the items, based on a result of detection of the action of cleaning up the items; determining content of a notification to be provided to a second subject person different from the first subject person, based on a result of determination of the scattering degree of the items and a result of determination of whether the first subject person has the interest; and providing a notification including the content determined to the second subject person.

The above method also realizes operational effects similar to those described above.

Moreover, in cleanup assisting system 1 according to the present embodiment, processor 5 determines a threshold indicating a scattering degree at which the first subject person loses interest in the action of cleaning up the items.

For example, the first subject person may scatter the items to such an extent that the person loses an interest in (energy for) the cleanup action. If left unattended, the first subject person will not clean up the items.

According to this embodiment, the above threshold can be used to determine the content of the notification to be provided to the second subject person. This facilitates the determination of appropriate content and thus enables the second subject person to support the first subject person more appropriately.

Moreover, cleanup assisting system 1 according to the present embodiment further includes storage 80 that stores the threshold. Processor 5 calculates, based on the threshold stored in storage 80, a cleanup capability value related to an action of the first subject person cleaning up the items scattered at the scattering degree.

As above, the first subject person's cleanup capability value can be accurately calculated based on historical data. This facilitates the determination of appropriate content and thus enables the second subject person to guide the first subject person to clean up the items according to the cleanup capability value. Thus, more efficient cleanup education can be provided.

Moreover, in cleanup assisting system 1 according to the present embodiment, processor 5 determines whether a cleanup possibility degree indicated by the cleanup capability value is greater than or equal to the scattering degree.

Processor 5 determines content that indicates, to the second subject person, encouraging the action of the first subject person cleaning up the items when the cleanup possibility degree is greater than or equal to the scattering degree. Further, processor 5 determines content that indicates, to the second subject person, helping the action of the first subject person cleaning up the items when the cleanup possibility degree is less than the scattering degree.

As above, the content of the notification provided to the second subject person for assisting the first subject person may vary depending on the first subject person's cleanup capability and the scattering degree of the items. For example, if the first subject person can clean up the scattered items, the second subject person may encourage the first subject person. This makes the first subject person feel like cleaning up the items and therefore enables the first subject person to learn the action of cleaning up items.

If the first subject person cannot clean up the scattered items, the second subject person may help (lend a hand to) the first subject person in cleanup. This makes the first subject person feel capable of cleaning up the items and therefore enables the first subject person to learn the action of cleaning up items. Thus, more efficient cleanup education can be provided.

In cleanup assisting system 1 according to the present embodiment, processor 5: increases the cleanup capability value when, of a total number of times that the first subject person has tried to clean up the items scattered at a predetermined scattering degree, a total number of successful cleanups is greater than or equal to a predetermined number of times, the total number of successful cleanups being a total number of times that the first subject person has successfully cleaned up the items; and decreases the cleanup capability value when, of the total number of times that the first subject person has tried to clean up the items scattered at the predetermined scattering degree, the total number of successful cleanups is less than the predetermined number of times.

As above, the cleanup capability can be calculated based on the cleanup success rate. This enables more accurate calculation of the first subject person's cleanup capability value.

[Variations Etc.]

The present disclosure has been described above based on an embodiment, but the present disclosure is not limited to the above embodiment.

For example, the cleanup assisting system according to the above embodiment may include a power supply for powering the space state detector, the space state determiner, the action state detector, the action state determiner, the processor, the communicator, and the storage. The power supply may be a battery such as a dry cell, or may be a power supply circuit that subjects power supplied from a commercial power source to DC-AC conversion.

The components of the cleanup assisting system according to the above embodiment may each be a separate device. Alternatively, the cleanup assisting device and the notifier may be integrated into a single device.

The cleanup assisting method according to the above embodiment may be implemented with a program using a computer. Such a program is stored in a storage.

A program that implements the cleanup assisting system and the cleanup assisting method according to the above embodiment is implemented as an LSI circuit, which is typically an integrated circuit. These may be formed in a single chip individually, or in a single chip that includes some or all of them.

Moreover, the method of circuit integration is not limited to LSI. Integration may be implemented with a specialized circuit or a general purpose processor. A field-programmable gate array (FPGA) for which programming can be performed after an LSI circuit is fabricated or a reconfigurable processor capable of reconfiguring connections and settings of circuit cells of an LSI circuit may be used.

Note that each of the elements in the above embodiment may be configured in the form of an exclusive hardware product, or may be implemented by executing a software program suitable for the element. Each of the elements may be implemented by means of a program executing unit, such as a CPU or a processor, reading and executing a software program recorded on a recording medium such as a hard disk or a semiconductor memory.

Moreover, all the numbers used above are mere examples used for specifically describing the present disclosure, and the embodiment of the present disclosure is not limited to such numbers.

Moreover, the block diagram illustrates one example of the division of functional blocks. A plurality of functional blocks may be implemented as a single functional block, a single functional block may be broken up into a plurality of functional blocks, and part of a function may be transferred to another functional block. In addition, functions of a plurality of functional blocks having similar functions may be processed in parallel or by time-division by a single hardware or software product.

Furthermore, since the processing order of the steps in the flowcharts is a mere example given for specifically describing the present disclosure, other processing orders may be adopted. In addition, a part of the steps may be performed simultaneously (in parallel) with another step.

The present disclosure also encompasses other forms achieved by making various modifications to the embodiment that are conceivable to those skilled in the art, as well as forms implemented by freely combining the elements and functions of the embodiment without departing from the essence of the present disclosure.

The invention claimed is:

1. A cleanup assisting system comprising:
 a space state detector that detects a state in which items are scattered in a space;
 a space state determiner that determines a scattering degree of the items based on a result of detection by the space state detector;
 an action state detector that detects an action of a first subject person cleaning up the items;
 an action state determiner that determines whether the first subject person has an interest in the action of the first subject person cleaning up the items, based on a result of detection by the action state detector;
 a processor that determines content of a notification to be provided to a second subject person different from the first subject person, based on a result of determination by the space state determiner and a result of determination by the action state determiner; and
 a notifier that provides a notification including the content determined by the processor to the second subject person.

2. The cleanup assisting system according to claim 1, wherein the processor determines a threshold indicating a scattering degree at which the first subject person loses interest in the action of cleaning up the items.

3. The cleanup assisting system according to claim 2, further comprising:
a storage that stores the threshold,
wherein the processor calculates, based on the threshold stored in the storage, a cleanup capability value related to an action of the first subject person cleaning up the items scattered at the scattering degree.

4. The cleanup assisting system according to claim 3, wherein the processor:
determines whether a cleanup possibility degree indicated by the cleanup capability value is greater than or equal to the scattering degree;
determines content that indicates, to the second subject person, encouraging the action of the first subject person cleaning up the items when the cleanup possibility degree is greater than or equal to the scattering degree; and
determines content that indicates, to the second subject person, helping the action of the first subject person cleaning up the items when the cleanup possibility degree is less than the scattering degree.

5. The cleanup assisting system according to claim 3, wherein the processor:
increases the cleanup capability value when, of a total number of times that the first subject person has tried to clean up the items scattered at a predetermined scattering degree, a total number of successful cleanups is greater than or equal to a predetermined number of times, the total number of successful cleanups being a total number of times that the first subject person has successfully cleaned up the items; and
decreases the cleanup capability value when, of the total number of times that the first subject person has tried to clean up the items scattered at the predetermined scattering degree, the total number of successful cleanups is less than the predetermined number of times.

6. A cleanup assisting method comprising:
detecting a state in which items are scattered in a space;
determining a scattering degree of the items based on a result of detection of the state in which the items are scattered;
detecting an action of a first subject person cleaning up the items;
determining whether the first subject person has an interest in the action of the first subject person cleaning up the items, based on a result of detection of the action of cleaning up the items;
determining content of a notification to be provided to a second subject person different from the first subject person, based on a result of determination of the scattering degree of the items and a result of determination of whether the first subject person has the interest; and
providing a notification including the content determined to the second subject person.

* * * * *